US008195196B2

(12) United States Patent
Haran et al.

(10) Patent No.: US 8,195,196 B2
(45) Date of Patent: Jun. 5, 2012

(54) MOBILITY BASED SERVICE IN WIRELESS ENVIRONMENT

(75) Inventors: Narayanan Haran, Hoffman Estates, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 780 days.

(21) Appl. No.: 11/618,295

(22) Filed: Dec. 29, 2006

(65) Prior Publication Data

US 2008/0160972 A1 Jul. 3, 2008

(51) Int. Cl.
*H04W 24/00* (2009.01)
(52) U.S. Cl. ............... 455/456.3; 455/414.2; 455/456.1
(58) Field of Classification Search .............. 370/238, 370/328, 338; 455/404.1, 404.2, 414.1–414.3, 455/421, 428, 433, 435.1–435.3, 445, 453, 455/455–457, 461
See application file for complete search history.

(56) References Cited

U.S. PATENT DOCUMENTS

| 7,031,700 | B1 * | 4/2006 | Weaver et al. | 455/420 |
|---|---|---|---|---|
| 7,136,631 | B1 * | 11/2006 | Jiang et al. | 455/414.1 |
| 7,653,700 | B1 * | 1/2010 | Bahl et al. | 709/217 |
| 2004/0242238 | A1 * | 12/2004 | Wang et al. | 455/456.1 |
| 2005/0097185 | A1 * | 5/2005 | Gibson et al. | 709/217 |
| 2005/0148342 | A1 * | 7/2005 | Sylvain | 455/456.3 |
| 2005/0232189 | A1 * | 10/2005 | Loushine | 370/328 |
| 2005/0272424 | A1 * | 12/2005 | Gallagher et al. | 455/435.1 |
| 2006/0029038 | A1 * | 2/2006 | Jungck | 370/351 |
| 2006/0258371 | A1 * | 11/2006 | Krishnamurthi et al. | 455/456.1 |
| 2006/0270421 | A1 * | 11/2006 | Phillips et al. | 455/457 |
| 2007/0116224 | A1 * | 5/2007 | Burke et al. | 379/201.12 |
| 2007/0142059 | A1 * | 6/2007 | Wang | 455/456.1 |

OTHER PUBLICATIONS

Farrell et al, DNS Encoding of Geographical Location, RFC 1712, pp. 1-7, Nov. 1994.*

* cited by examiner

*Primary Examiner* — Nick Corsaro
*Assistant Examiner* — Chuong A Ngo
(74) *Attorney, Agent, or Firm* — Leydig, Voit & Mayer Ltd.

(57) ABSTRACT

A system and method are described for providing proximity-based Internet server access in mobile network environments such as cellular environments to reduce latency and enhance customer satisfaction. In an embodiment of the invention, a Mobile Positioning Center (MPC) caches location information regarding the mobile device. When the mobile device later attempts to resolve the domain name of a distributed service, the domain name service (DNS) server, via a policy manager, queries the MPC for the location of the user. The policy manager of the DNS server may then choose a server based on a number of criteria, including, for example, the geographical proximity of the user to the server.

16 Claims, 5 Drawing Sheets

| LOCATION DATA TABLE 400 ||
|---|---|
| DEVICE ID 1 ↔ | LOCATION 1 |
| DEVICE ID 2 ↔ | LOCATION 2 |
| DEVICE ID 3 ↔ | LOCATION 3 |
| DEVICE ID 4 ↔ | LOCATION 4 |
| DEVICE ID 5 ↔ | LOCATION 5 |
| DEVICE ID 6 ↔ | LOCATION 6 |
| 401 | 403 |

*FIGURE 4*

MOBILITY BASED SERVICE IN WIRELESS ENVIRONMENT

FIELD OF THE INVENTION

This invention relates generally to the field of wireless communications and more specifically to the field of location based mobile services.

BACKGROUND OF THE INVENTION

As mobile computing and communication devices become more prevalent and more powerful, an increasing number of more traditional computing and communication functions are being offered for mobile devices. As these services become available, mobile users expect to seamlessly receive the same services that they receive via their more traditional computing devices, such as their home personal computers (PCs). The inherent mobility of the user and hence the mobile device, allow certain unique services, such as those adapted to accommodate differing locations. For example, location-based services provide information or support services that are tailored to the user's current location. Such services include services related to navigation, weather, traffic, entertainment, and so on. In this regard, the user's mobility presents opportunities for enhanced services.

At the same time, however, the user's inherent mobility poses certain challenges beyond those faced in more traditional computing and communication environments. For example, the proximity-based Internet server access that is being achieved in fixed network environments has never been realized in the mobility intensive cellular environment. In particular, in fixed network environments, Internet portals are mirrored across multiple geographical locations to reduce latency and provide better customer experience. While the speed of electronic transmission essentially moots the issue of distance over any particular link, the number of hops on a given path increases latency due to processing time. Moreover, the distribution and replication of services provides a logical load balancing function as well.

In the mobile network environment, the nearest portal available to a given mobile device may change periodically as the user travels. Without the means to provide proximity-based Internet server access that mobile users have come to expect in other environments, mobile service providers expose users to unexpected latency and thus generate a decreased level of user satisfaction and mobile service adoption.

BRIEF SUMMARY OF THE INVENTION

Embodiments of the invention provide proximity-based Internet server access in mobile network environments such as cellular environments to provide reduced latency and enhanced customer satisfaction. In an embodiment of the invention, a network operator determines the location of the mobile device using an implementation of Location Based Services (LBS) using either a control plane or user plane process. A Mobile Positioning Center (MPC) then caches the location information regarding the mobile device. Although the timing and mechanism used to gather the location information for the mobile device is not critical, in an embodiment of the invention, the location information is determined periodically in a manner chosen by the operator. In an alternative embodiment, the mobile device comprises a setting that establishes a schedule and mechanism for pushing the location data to the operator.

The location data may be obtained in a number of ways, but in one embodiment, the data is determined based on GPS data from the mobile device. Other available mechanisms include utilization of the subnet ID (SID) associated with the device and other traditional means for determining location.

In operation, when a subscriber device endeavors to resolve the domain name of a distributed service, the domain name service (DNS) server, via a policy manager implementing a policy, queries the MPC for the location of the user. As noted above, the MPC has cached the location of the user. Thus, when queried, the MPC returns to the DNS server the location information, e.g., latitude and longitude, of the user based on the subscriber IP address provided. The policy manager of the DNS server may then choose a server based on a number of criteria, including, for example, the geographical proximity of the user to the server.

Embodiments of the invention can be used to support a number of practical applications including location based traffic distribution and location based service control. For example, a carrier may wish to deny RIM® data service to a user that is roaming in a partner's network based on their capabilities, or the carrier may wish to deny PTT service in certain regions due to performance issues.

Additional and alternative aspects and advantages of the invention will become apparent to those of skill in the art upon reading the following detailed description of examples of the invention in conjunction with the Figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 4 is a data structure diagram illustrating a tabular storage format for location data in an embodiment of the invention wherein each device ID is linked to location data.

DETAILED DESCRIPTION OF THE INVENTION

The following examples further illustrate examples of the invention but are intended to be illustrative rather than limiting, and as such the appended claims should not be construed as being limited in any way to the disclosed examples.

Figure 1:
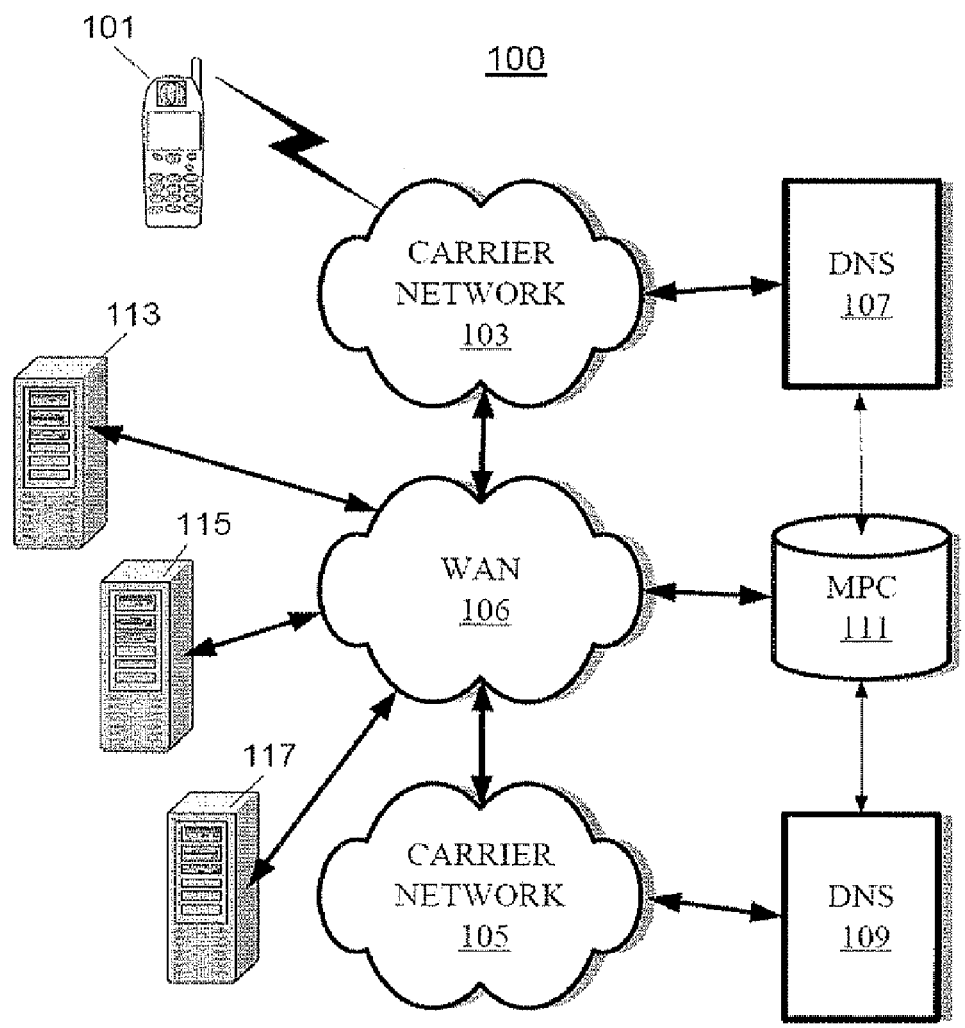
FIG. 1 is a schematic diagram illustrating an IP multimedia network environment, wherein a mobile device communicates with an application server located in an IMS core network via one or more heterogeneous access networks, as contemplated by an embodiment of the present invention.

Turning to FIG. 1, an environment in which embodiments of the invention may be used is illustrated schematically. The exemplary network environment 100 includes a wirelessly communicating mobile device 101 that may be associated with a user and/or a vehicle, and that is sized and configured so as to be movable from one geographic location to another. Although the illustrated device 101 is a cellular phone, other mobile devices are usable within the invention as well.

Examples of other devices include but are not limited to networked or networkable laptop and notebook computers, vehicle telematics units, personal digital assistants, and so on.

The network environment 100 further comprises a first carrier network 103 in communication with the mobile device 101 and a second carrier network 105. Each carrier network 103, 105 is associated with a wide area network (WAN) 106 such as the Internet or other such network. In addition, each carrier network 103, 105 is associated with one or more domain name service (DNS) servers. Although FIG. 1 illustrates a DNS server 107, 109 associated with each carrier network 103, 105, a typical carrier network may comprise or communicate with multiple DNS servers, and moreover, multiple carrier networks may communicate with one or more common or shared DNS servers in addition to, or instead of, dedicated servers.

DNS is a well-known Internet directory service that translates alphanumeric domain names into corresponding IP addresses. The DNS affects both domain name resolution and email delivery. Resource records in the DNS are split into files that are commonly referred to as zones. Zones are maintained on distributed servers available via the Internet. Some DNS servers are also caching servers, meaning that they cache any replies from other DNS servers for information that they do not originate.

Each DNS server 107, 109 is communicably linked or linkable to a Mobile Positioning Center (MPC) 111 that assists in associating a given mobile device such as device 101 with an appropriate server for serving desired content. In the illustrated example, the MPC caches location information for the mobile device as will explained in greater detail below, and provides that information to the DNS servers 107, 109 upon request. Although the MPC is illustrated as a single device, it will be appreciated that the MPC may comprise multiple cooperating and/or redundant devices.

Finally, the network environment 100 further comprises multiple geographically dispersed servers 113, 115, 117. In the illustrated example, a portion of the data on one server 113 is mirrored on the other servers 115, 117. This reproduction and exposure of information via multiple servers 113, 115, 117 is maintained to provide scalability (due to increased capacity), reduced latency (due to increased capacity and/or proximity), security (due to redundancy), and/or other functions or properties.

Before discussing in detail the interrelationships and functions of the devices of network environment 100, a brief overview of the system function will be provided to guide the subsequent discussion. The mobile device 101 communicates its position to the MPC 111 via the carrier network 107 or other network with which it is currently associated. The MPC 111 then stores that location information in a manner so that it is retrievable and linkable to the particular device 101. At a later time when the device 101 attempts to connect to a server such as a content server 113, 115, 117, the DNS 105 calls the MPC to determine the location of the user device. The MPC 11111 returns the location of the device 101, which is then used to select an appropriate server, e.g., one of servers 113, 115, 117, to provide the requested service or data to the device 101.

The foregoing architecture may implemented via the control plane (i.e., the signaling network, SS7 messaging) or the user plane (i.e., an IP-based system). While control plane implementations may provide more robust services, they are also generally inherently more complex and expensive to deploy and maintain.

Figure 2:
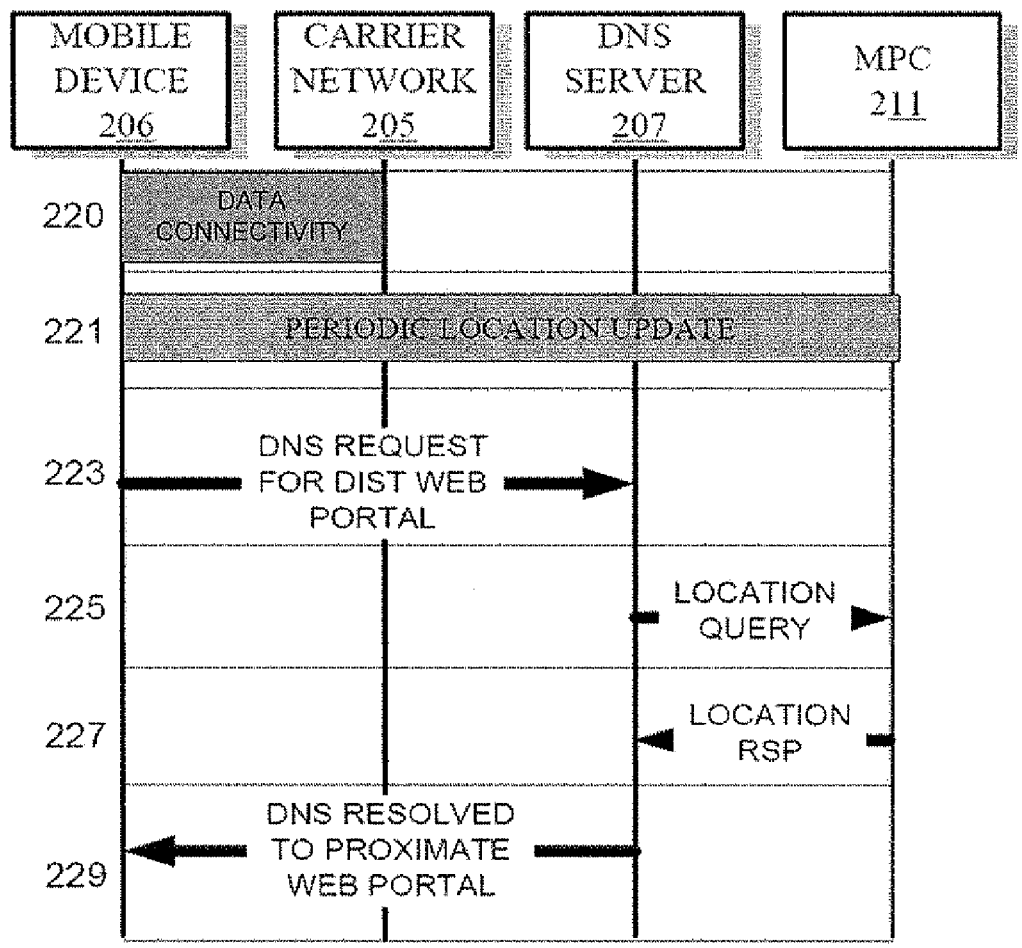
FIG. 2 is a communication graph illustrating high level messages and communications involved in server selection in an embodiment of the invention.

The communication graph of FIG. 2 illustrates the high level messages and communications involved in server selection in an embodiment of the invention. In particular, communications between the mobile device 206, the carrier network 205, the DNS server 207, and the MPC 211 are shown during normal data operations as well as server selection. Initially at communication 220, the mobile device 206 is provided general data connectivity service by the carrier network 205.

As noted above, the location information regarding the mobile device 206 is periodically provided to the MPC 211. Thus, at communication 221, the device or carrier network sends location information to the MPC 211. This location update may be strictly periodic or may be made upon a request from the MPC 211. Alternatively, in an embodiment of the invention, the location update 221 is triggered by the device location. For example, the crossing of a state, county or other geographic division or border may initiate a location update. Alternatively, acquisition of a new subnet may trigger an update message.

With respect to the strictly periodic gathering of location information, in an embodiment of the invention, the location information is determined periodically in a manner chosen by the operator. In an alternative embodiment, the mobile device comprises a setting that establishes a schedule and mechanism for pushing the location data to the operator.

The location data may be obtained in a number of ways, but in one embodiment, the data is determined based on GPS data from the mobile device. Other available mechanisms include utilization of the subnet ID (SID) associated with the device and other traditional means for determining location.

At communication 223, the device 206 makes a request that requires resolution of a server to provide the necessary service and a DNS request is submitted to the DNS server. For example, the device may request that requires access to a web portal.

The DNS server 207 is able to resolve the request to one or more servers, but typically cannot easily determine which of these available servers would be optimal for the particular device in question. As noted above, geographic distance between the device and the chosen server may impact the latency experienced by the user in accessing the service. Thus, at communication 225, the DNS server transmits a location request to the MPC 211.

The MPC 211 returns the last known location of the device 206 to the DNS server 207 in communication 227. If there is no location information at the MPC 211 for that device 206, then the MPC 211 returns an "unavailable" response instead. In an embodiment of the invention, such a response is used to trigger a location update as in communication 221.

If location information was returned in communication 227, the DNS server 207 uses that information to resolve a providing server that is most proximate to the device 2206. At communication 229, the DNS server 207 returns the address of the proximate web portal for use by the device 206 in accessing the service of interest.

It will be appreciated that although the communications graph of FIG. 2 references a DNS decision among multiple suitable servers based solely on proximity to the device in question, other criteria may be weighed as well. For example, available maintenance information may indicate that an otherwise proximate server is or will shortly become unavailable. In addition, link data may indicate that the proximate server is experiencing heavy traffic or is otherwise unable to provide service at a level available from another more distant server.

Figure 3:
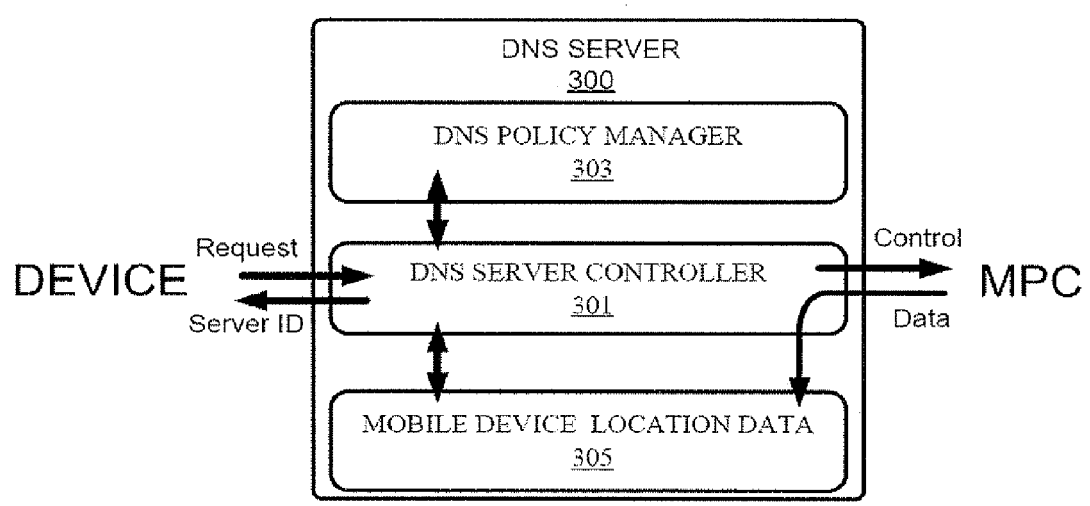
FIG. 3 is a schematic diagram illustrating a DNS server architecture including a policy manager, controller, and data storage in embodiments of the present invention.

As noted above, the DNS serves 107, 109 make server selections for the device 100 based on a policy. FIG. 3 illustrates the DNS server architecture at a high level showing the various components of interest in embodiments of the present invention. The DNS server 300 comprises a controller 301, a policy manager 303, and a location data memory 305. In operation, the controller receives a request for a server ID from the device in question. The controller 301 communicates with the MPC to retrieve the device location data and stores that data in the location data memory 305.

The manner of storage is not critical, but in an embodiment of the invention, the location data is stored in a tabular format wherein each device ID is linked to location data as illustrated in FIG. 4. The illustrated table 400 comprises a device ID field 401 and a location data field 403. The location data field may store location data in any suitable format, e.g., latitude and longitude, region, etc.

The policy manager 303 of the DNS server 300 retrieves the location data stored in the location data memory 305 and then determines a best server for the device based at least in part on the location data. The identified server ID is then communicated from the controller 301 to the device in question.

Figure 5:
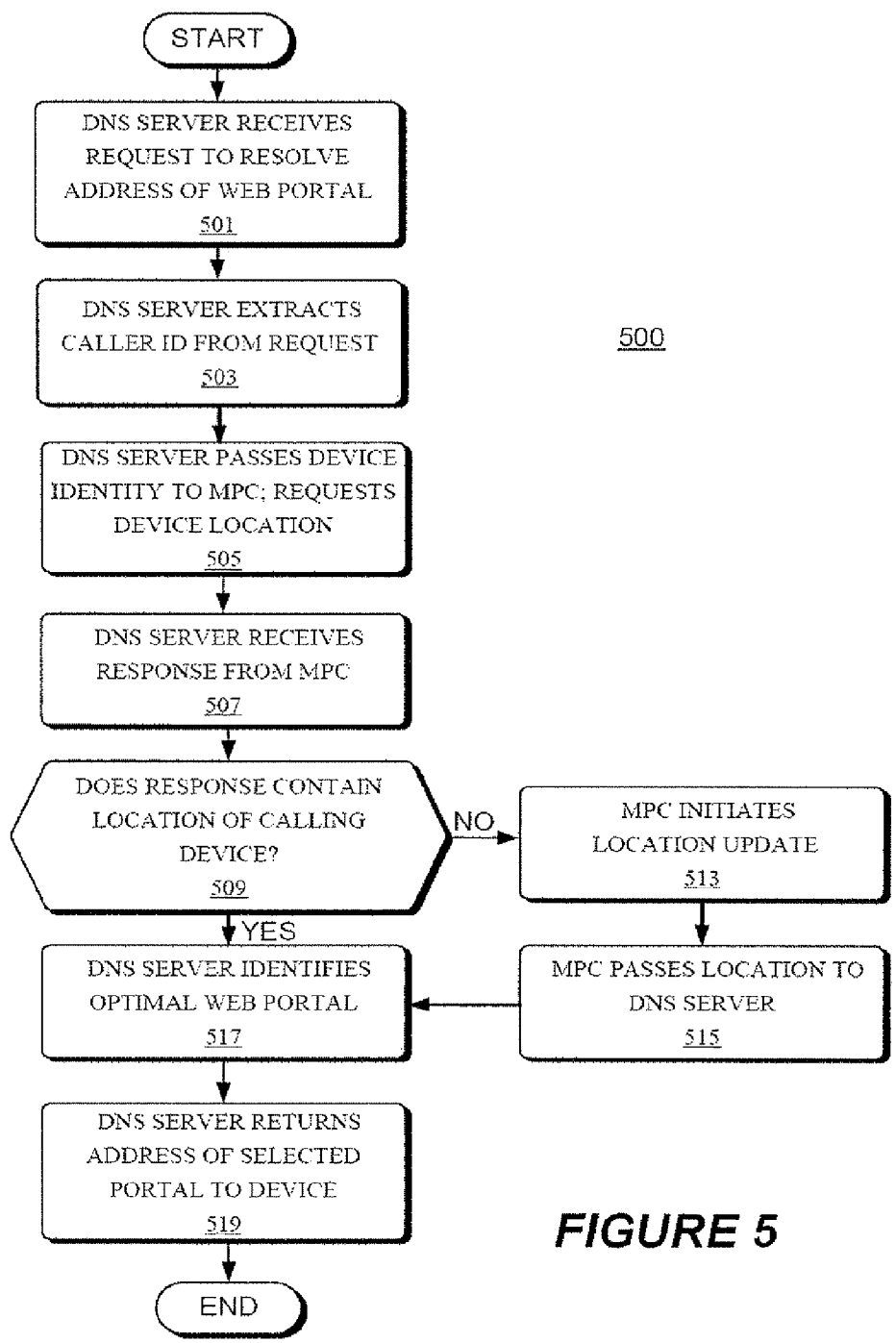
FIG. 5 is a flow chart illustrating a process of DNS resolution according to an embodiment of the invention.

FIG. 5 illustrates a flow chart of an exemplary process for DNS resolution at a DNS server in an embodiment of the invention according to the foregoing principles. At stage 501 of the process 500, the DNS server receives a request from a device to resolve the address of a web portal. The request may be a service request that requires such resolution to execute or it may be a plain request for the data of interest. As will be appreciated by those of skill in the art, the data in the request is usable to identify the calling device. At stage 503, the DNS server extracts the caller ID from the request to learn the identity of the calling device.

Having obtained sufficient information to identify the calling device, the DNS server passes the device identity to the MPC in stage 505 with a request for device location information. In stage 507, the DNS server receives a response from the MPC. As indicated at stage 509, the response either conveys the location of the calling device to the DNS server or indicates that the MPC has not stored location data for that particular device. If the response contains the location data for the device, the process flows to stage 511. Otherwise, the MPC initiates a location update with the calling device in stage 513 in an embodiment of the invention and then passes that location information to the DNS server in stage 515.

The process branches recombine at stage 517, whereat the DNS server uses the retrieved location information to identify a web portal to serve the user request. This stage may be executed in any number of ways depending upon implementation preferences; however, in an embodiment of the invention, the DNS server selects a web portal based on its proximity to the requesting mobile device. In further embodiments of the invention, the DNS server may also consider additional information such as link status and server capacity in selecting an optimal portal. For example, if the nearest portal is near capacity or is experiencing a large number of dropped packets, the DNS server may select the next closest portal instead if that portal has sufficient capacity. Finally at stage 519, the DNS server returns the address of the selected portal to the calling device and the process terminates.

Embodiments of the invention can be used to support a number of practical applications including location based traffic distribution. In particular, the geographic distribution of resources not only reduces latency but can also be used to disperse traffic loads as well.

Embodiments of the invention can also be used to support location based service control. For example, a carrier may wish to deny SMS-to-Email service to a user that is roaming in a partner's network based on the capabilities of the partner network. As another example, the carrier may wish to deny push-to-talk (PTT) service in certain regions due to performance issues. PTT operation requires additional functionality for supporting individual half-duplex transmissions from one party to another (i.e., not a traditional full-duplex connection) without needing an existing call connection. Thus, in regions where the needed functionality is absent, it would be desirable to deny such service.

It will be appreciated that a new and useful system of location based service selection has been described herein. Although the disclosure has referenced specific examples, it will be appreciated that the invention is limited only by the appended claims and not by the specific examples herein. No language in the specification should be construed as indicating any nonclaimed element as essential to the practice of the invention. Moreover, please appreciate that any language of disparagement or distinction is intended to connote a lack of preference for the feature under discussion, and is not intended, and should not be taken, to exclude that feature entirely from the scope of the invention unless otherwise expressly indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for providing a network address of a web portal to a wireless mobile device, the method comprising:

receiving a request from the mobile device at a DNS server to resolve the network address for the web portal, the network address for the web portal corresponding to one of a plurality of web portals from which a distributed network service is available, the distributed network service being mirrored across the plurality of web portals;

transmitting a request from the DNS server to a separate cache device to request a geographic location of the wireless mobile device cached at the separate cache device;

receiving at the DNS server a response from the separate cache device, the response containing the cached geographic location of the wireless mobile device; and selecting, via the DNS server, one of the plurality of web portals as a desired web portal from which the distributed network service is available based at least in part on a proximity of the selected one of the plurality of web portals to the geographic location of the wireless device.

2. The method according to claim 1, further comprising transmitting the network address of the selected one of the plurality of web portals to the wireless device.

3. The method according to claim 1, further comprising denying a desired service to the wireless device based on the location of the wireless device.

4. The method according to claim 3, wherein the desired service is PTT service.

5. The method according to claim 3, wherein the desired service is a data service.

6. The method according to claim 1, wherein the step of selecting one of the plurality of web portals as the desired web portal is further based at least in part on a traffic load of at least one of the plurality of web portals.

7. The method according to claim 6, wherein the selected web portal is farther from the wireless device than at least one other of the plurality of web portals.

8. The method according to claim 1, wherein the selected web portal is the nearest one of the plurality of web portals to the wireless device.

9. A non-transitory computer-readable medium having thereon computer-executable instructions for providing a network address of a web portal to a wireless mobile device, the instructions comprising:

instructions for receiving a request from the mobile device at a DNS server to resolve the network address for the web portal, the network address for the web portal corresponding to one of a plurality of web portals from which a distributed network service is available, the distributed network service being mirrored across the plurality of web portals;

instructions for transmitting a request from the DNS server to a separate cache device to request a geographic location of the wireless mobile device cached at the separate cache device;

instructions for receiving at the DNS server a response from the separate cache device, the response containing the cached geographic location of the wireless mobile device; and instructions for selecting, via the DNS server, one of the plurality of web portals as a desired web portal from which the distributed network service is available based at least in part on a proximity of the selected one of the plurality of web portals to the geographic location of the wireless device.

10. The computer-readable medium according to claim 9, further comprising instructions for transmitting the network address of the selected one of the plurality of web portals to the wireless device.

11. The computer-readable medium according to claim 9, further comprising instructions for denying a desired service to the wireless device based on the location of the wireless device.

12. The computer-readable medium according to claim 11, wherein the desired service is a push-to-talk service.

13. The computer-readable medium according to claim 11, wherein the desired service is an SMS-to-Email service.

14. The computer-readable medium according to claim 9, wherein selecting one of the plurality of web portals as a desired web portal is further based at least in part on a traffic load of at least one of the plurality of web portals.

15. The computer-readable medium according to claim 14, wherein the selected web portal is farther from the wireless device than at least one other of the plurality of web portals.

16. The computer-readable medium according to claim 9, wherein the selected web portal is the nearest one of the plurality of web portals to the wireless device.

* * * * *